United States Patent
Linemann

(10) Patent No.: US 6,680,364 B1
(45) Date of Patent: Jan. 20, 2004

(54) WATER DISPERSIBLE POLYAMIDES WITH ETHYLENICALLY UNSATURATED ENDS

(75) Inventor: Reinhard Linemann, Bernay (FR)

(73) Assignee: Atofina, Puteaux (FR)

( * ) Notice: Subject to any disclaimer, the term of this patent is extended or adjusted under 35 U.S.C. 154(b) by 0 days.

(21) Appl. No.: 09/979,259

(22) PCT Filed: May 16, 2000

(86) PCT No.: PCT/FR00/01339

§ 371 (c)(1),
(2), (4) Date: Feb. 22, 2002

(87) PCT Pub. No.: WO00/71603

PCT Pub. Date: Nov. 30, 2000

(30) Foreign Application Priority Data

May 21, 1999 (FR) .............................. 99 06472

(51) Int. Cl.[7] ..................... C08G 69/02; C08G 69/04; C08G 69/42
(52) U.S. Cl. ................. 528/310; 528/312; 528/313; 528/322; 528/323; 528/331; 528/332; 528/335; 528/336; 528/337; 528/339; 528/340; 528/347; 528/345
(58) Field of Search ............................. 528/310, 312, 528/313, 322, 332, 335, 336, 323, 331, 340, 347, 339, 337, 345

(56) References Cited

U.S. PATENT DOCUMENTS

| 3,296,204 A | | 1/1967 | Caldwell | |
|---|---|---|---|---|
| 3,483,104 A | | 12/1969 | D'Alelio | |
| 3,639,659 A | * | 2/1972 | Nieswandt et al. | 528/495 |
| 3,657,194 A | * | 4/1972 | Biensan et al. | 528/312 |
| 3,997,646 A | * | 12/1976 | Schneider et al. | 264/211.24 |
| 4,310,659 A | * | 1/1982 | Yates et al. | 528/323 |
| 4,327,208 A | * | 4/1982 | Lehr et al. | 528/323 |
| 4,436,897 A | * | 3/1984 | Strehler et al. | 528/323 |
| 4,816,557 A | * | 3/1989 | Pipper et al. | 528/500 |
| 4,978,743 A | * | 12/1990 | Selbeck et al. | 528/499 |
| 5,077,381 A | * | 12/1991 | Dellinger | 528/323 |
| 5,179,175 A | * | 1/1993 | Speranza et al. | 525/432 |
| 5,324,812 A | * | 6/1994 | Speranza et al. | 528/338 |
| 5,674,973 A | * | 10/1997 | Pipper et al. | 528/323 |
| 5,696,227 A | * | 12/1997 | Mumcu | 528/318 |
| 5,777,067 A | * | 7/1998 | Sato et al. | 528/310 |
| 6,228,976 B1 | * | 5/2001 | Faulhammer et al. | 528/310 |
| 6,420,045 B1 | * | 7/2002 | Faulhammer et al. | 428/474.4 |

FOREIGN PATENT DOCUMENTS

| EP | 0 143 037 | 10/1984 |
|---|---|---|
| EP | 0 147 267 | 11/1984 |
| EP | 0 147 367 | 12/1984 |

OTHER PUBLICATIONS

PCT International Search Report (in French) for counterpart appln. No. PCT/FR 00/01339, dated Aug. 29, 2000.

* cited by examiner

*Primary Examiner*—P. Hampton Hightower
(74) *Attorney, Agent, or Firm*—Smith, Gambrell & Russell, LLP

(57) ABSTRACT

The invention describes polyamides having both strongly hydrophilic groups and unsaturated groups, the polyamides consequently being water-dispersible and curable.

The hydrophilic groups are distributed along the chain, whereas the unsaturated groups are located at the ends.

The polyamides of the invention are useful in many applications, especially in the preparation of intimate blends of polyamides with vinyl, acrylic and/or styrene polymers.

9 Claims, No Drawings

WATER DISPERSIBLE POLYAMIDES WITH ETHYLENICALLY UNSATURATED ENDS

FIELD OF THE INVENTION

The invention relates to the field of polyamides, in particular to unsaturated water-dispersible polyamides having at most two unsaturated groups preferably located at the ends, to their method of preparation and to the use of such polyamides in various applications.

BACKGROUND OF THE INVENTION

The polyamides, denoted hereafter by PAs, are well known and extensively described. They are used in various industries, particularly in the textile industry, the paper industry, the coatings industry, the cosmetics industry and in others.

For some applications, such as those requiring a modification by grafting of the polyamide chain or crosslinking, it is useful to have a PA having one, or even several, double bonds.

For other applications, in particular for formations based on aqueous compositions, it is necessary to have a water-dispersible PA, hereinafter called WDPA. Finally, for really specific applications, it is necessary to have a PA which is both water-dispersible and has unsaturated groups. Such a polyamide is called hereafter UWDPA.

EP 147,367 describes a PA having an unsaturated group at each end. This PA is obtained using the method consisting in heating, to a temperature ranging from 210° C. to 300° C., a mixture consisting of 2 to 240 mol of a PA monomer, 2 mol of at least one unsaturated compound and 1 mol of an auxiliary compound which ensures that the unsaturated compound is attached to the ends.

EP 143,037 uses virtually the same method to prepare a PA having a single unsaturated group at one end.

U.S. Pat. No. 3,296,204 describes the preparation of a polyamide having sulphonate groups condensed by hydrophilic diacids carrying a sulphonate group, in the form of a salt or of diamines.

In DE-C-2,308,266, polyamides carrying sulphonate groups are used as an extrusion additive for polyamides for the preparation of textile fibres.

To our knowledge, no document exists which describes WDPAs having one or more unsaturated groups.

DESCRIPTION OF THE INVENTION

The problem that the Applicant aims to solve is how to prepare a polyamide meeting the criteria described above, namely a water-dispersible polyamide having at least one terminal unsaturated group. Such a compound may be easily dispersed in water and may undergo modifications, such as grafting.

One of the subjects of the invention is a water-dispersible polyamide having from 0.1 to 2 unsaturated groups, and preferably from 0.5 to 2 unsaturated groups, per chain at the chain ends.

Another subject of the invention is a process for the preparation of a UWDPA.

WDPAs with unsaturated groups (UWDPA) of the invention are characterized by a number-average mass ranging from 500 to 30,000 g/mol and preferably from 1000 to 10,000 g/mol. The average content of the hydrophilic group(s) per PA chain is from 0.5 to 49 mol % and preferably from 3 to 25 mol %.

The average mass of the PA chain and the content of the hydrophilic group(s) play a paramount role in the water-dispersibility of the PA. The preferred UWDPAs of the invention have an average mass of 4000 to 10,000, an average content of the hydrophilic group(s) of 5 to 15 mol % and a content of unsaturated group(s) of at least 0.1 per chain.

The method of obtaining the UWDPAs of the invention, forming another subject of the invention, consists in heating, to a temperature ranging from 150° C. to 300° C., for a time of 2 to 8 hours in an inert atmosphere and at a pressure of 0.5 to 50 bar, a mixture consisting of:

0 to 99 mol % of at least one PA monomer (A);

0.5 to 50 mol % of at least one diamine (B) having from 4 to 12 carbon atoms;

0.5 to 49 mol % of at least one dicarboxylic acid (C) having 4 to 12 carbon atoms and having a sulphonate group;

0.5 to 30 mol % of at least one dicarboxylic acid (D) having 2 to 36 carbon atoms; and the sufficient amount of at least one compound (E), having an unsaturated group and able to fulfil the role of a terminator in the polycondensation reaction, in order to introduce at least 0.1 unsaturated group per PA chain.

The method of obtaining the UWDPAs according to the invention is characterized in that the mixture of the diacides (C) and (D) and of the diamines (B), taken in a diacide/diamine ratio of 1, is heated in the presence of an ethylenic acid satisfying the formula $R^1R^2C=CR^3COOH$, in order to result in a UWDPA which satisfies the formula $R^1R^2C=CR^3$—CO—NH—PA—COOH ... (I), one chain end of which carries the unsaturated group $R^1R^2C=CR^3CO$ from the acid employed.

If a diamine $H_2N$—B—$NH_2$ is added, it gives, upon heating, with the other chain end of the UWDPA (I), an amine-containing termination: $R^1R^2C=CR^3$—CO—NH—PA—CO—NH—B—$NH_2$ ... (II).

By reacting one equivalent of ethylenic acid with the UWDPA (II), amidifying the —$NH_2$ of the UWDPA (II), a polyamide carrying two double bonds, one at each end of the chain, is formed: $R^1R^2C=CR^3$—CO—NH—PA—CO—NH—B—NH—OC—$CR^3=CR^1R^2$ ... (III).

Another unexpected aspect in the method of the invention is that it seems that the above three reactions, leading to the structures (I), (II) and (III), can be carried out at the same time if n moles of the monomers (A), (B), (C) and (D) are mixed in advance in an acid/amine ratio of 1 in the presence of 0.1 to 2 mol of ethylenic acid and 1 mol of diamine in excess.

Similarly, the invention may be carried out by using an unsaturated amine $R^1R^2C=CR^3NH_2$, which leads to a UWDPA at one of its ends: $R^1R^2C=CR^3$—NH—CO—PA—$NH_2$ ... (IV).

In order to go a di-unsaturated UWDPA, it is possible to treat (IV) with an olefinic acid for the purpose of amidizing the remaining $NH_2$ to form: $R^1R^2C=CR^3$—NH—CO—PA—NH—CO—$CR^3=CR^1R^2$) ... (V).

Another way of attaching the unsaturated group is to firstly use, as an intermediate compound, a diacide HOOC—(C)—COOH or HOOC—(D)—COOH and then a $2^{nd}$ mole of amine $R^1R^2C=CR^3NH_2$ or, for example, an epoxy compound in a reciprocal manner with respect to that of the reactions (II)–(III) seen above.

The foregoing gives an idea of the structure of the UWDPAs obtained according to the invention.

In order to achieve static incorporation of the hydrophilic monomers (in the presence of an unsaturated monomer), for example a diacide carrying a sulphonate group, it is preferable to carry out the method for preparing a UWDPA of the invention at equilibrium and/or by increasing the temperature during the pressure release.

$R^1$, $R^2$ and $R^3$ are defined later.

In general, the PA monomer (A) is either a monoaminocarboxylic acid (A1) having from 2 to 12 carbon atoms and the corresponding lactam, or a mixture of two compounds, one being a dicarboxylic acid and the other a diamine taken in a diacide/diamine ratio of 1/1.

The monomers (A) are chosen from omega amino acids, their lactams or omega-amino acids, for example: caprolactam, enantholactam, lauryllactam, amino caproic acid, oenantholactam, 7-amino heptanoic acid, 11-amino undecanoic acid and 12-amino dodecanoic acid.

The preferred monomer (A) of the invention is caprolactam, lauryllactam, amino caproic acid or 11-amino undecanoic acid.

The diamine monomers (B) and diacide monomers (C) and/or (D) are used either as a mixture or as an acid salt (A2).

The diamines (B) are chosen from hexamethylenediamine, decamethylenediamine, dodecamethylenediamine, 1,5-diaminohexane, 2,2,4-trimethyl-1,6-diaminohexane, piperazine, 3,3'-dimethyl-4,4'-diaminodicylcohexyl-methane, 4,4'-diaminodicyclohexylmethane, 2,2'-(4,4'-diaminodicyclohexyl)propane, isophorone diamine, 1,4-diaminocyclohexane and meta-xylylenediamine.

It is also possible to use diamine polyols, such as those sold under the name "JEFFAMINE" by Huntsman Corp.

The preferred grades are JEFFAMINE D400 and JEFFAMINE D2000. These polyether chains especially increase the hydrophily of the resins. Their weight content may be as much as 60% by weight of the total weight of UWDPA.

The preferred diamines (B) are hexamethylenediamine, tetramethylenediamine, 2,2,4-trimethyl-1,6-diaminohexane and piperazine.

The diacide (C) having a hydrophilic group is chosen from diacides having at least one sulphonate group. The sulphonate group is generally introduced via a dicarboxylic acid, in the form of a lithium, sodium, potassium or ammonium salt. The preferred compounds of the invention are isophthalic acid salts.

The diacide (D) is chosen from the group consisting of isophthalic, adipic, azelaic, sebacic, dodecanoic, butanedoic, 1,4'-cyclohexyl dicarboxylic and terephthalic acids (content less than 12% by weight) and dimerized fatty acids (these dimerized fatty acids preferably have a dimer content of at least 98% and preferably they are hydrogenated; they are sold under the brand name "PRIPOL" by Unichema, the most useful grades being PRIPOL 1008, PRIPOL 1009 and PRIPOL 1013, or under the brand name EMPOL by Henkel).

The preferred diacide (D) is chosen from adipic acid, isophthalic acid and terephthalic acid.

The amount of terminator to be introduced depends on the mass of the chain that it is desired to obtain.

The terminator (E) having an unsaturated group is chosen from the group containing molecules satisfying the following formula: $R^1R^2C=CR^3X$ (1), in which the groups or atoms $R^1$, $R^2$, $R^3$, which are similar or different are: H, halogen, alkyl, aryl, particularly phenyl and carboxyl, norbornyl, thienyl, pyrrolyl or furanyl, whereas the active group X may be:

—$(CH_2)_n$COOH with n=0 to 17;
—$(CH_2NH(CH_2)_n$COOH;
—$(OCH_2CH_2)_k$OH with k=20;
—COO—glydicyl;
—Y—$C_6H_4$—$(CH_2)_{n'}$—COOR with n'=0 or 1, Y being —COO or —CONH and R being H, alkyl or aryl;
—$CH_2$OH;
—$(CH_2)_m$NH$_2$ with m=0 to 18; or
—$(OCH_2CH_2)$ OH.

Particularly favourable examples of compounds according to formula (I) are therefore:

unsaturated acids or acid esters, such as acrylic, methacrylic, cinnamic, crotonic, citraconic, itaconic, vinylacetic, undecylenic, maleic, fumaric, 2-(5'-norbornyl)-acrylic, 2-(3'-pyrrolyl)acrylic, N-allyl-aminobenzoic, N-acryloylaminobenzoic, N-methacryldylaminobenzoic, acryloyl-oxybenzoic, methacryloyloxybenzoic, N-acryloyl- or N-methacryloyl-p-aminophenylacetic and N-allyl-11-aminoundecanoic acids, and the like.

Unsaturated compounds of another type, suitable for the method according to the invention, may be possible without being limited: N-maleimido acids and esters, of the hexaonoic, p-benzoic and dodecanoic types, etc.

Mention may also be made of anhydrides and imides derived from anhydrides, such as those of the tetrahydrophthalic, p-maleimidobenzoic and p-(endocis-bicyclo[2.2.1]hept-5-ene-2,3-dicarboxylic) types.

The sulphonate group is introduced hot, while the unsaturated group may be introduced cold.

EXAMPLES

According to the invention, the procedure is as described in the examples, which illustrate the invention without limiting its scope.

Example 1

Preparation by introducing all the monomers at the start of a mono-unsaturated UWDPA functionalized by cinnamic acid.

The preparation is carried out in a reactor of 4 litre capacity, having three ports, namely one for gas inlet, one for communication with a distillation system comprising a condenser connected to a distillate receiver, and one for an anchor stirrer. Introduced into this reactor are 339.0 g of lactam-6, i.e. 3.0 mol, 196.2 g of AH salt (the salt of adipic acid and hexamethylenediamine) i.e. 0.75 mol, 187.34 g of hexamethylenediamine, i.e. 1.615 mol, 168.5 g of isophthalic acid, i.e. 1.015 mol, 161.0 g of the monosodium salt of sulpho isophthalic acid, i.e. 0.6 mol, 22.5 g of cinnamic acid, i.e. 0.152 mol, which corresponds to one cinnamic acid unit per UWDPA chain, and 50 g of water.

The reactor is purged with nitrogen and then heated, with all valves closed, to 200° C. (material temperature) over 1 hour, the pressure then being 6.0 bar. At this point, the stirrer is switched on and the material temperature is raised over 1 hour to 240° C., the pressure then being 15 bar. The reaction is left to proceed at 240° C. (material temperature) for 4 hours, the pressure after holding for 4 hours reaching 18 bar and stabilizing, which means firstly that all the monomers react and secondly that amide formation equilibrium is achieved. At this point, the pressure is released (over 90 minutes) and the material temperature at the end of the release is 270° C. A stream of nitrogen is introduced at 30 l/h for 15 minutes and the WDPA is removed from the reactor and collected in a cooled tray in order to ensure rapid solidification.

The product obtained is slightly yellow, friable and colourless. The number-average molecular mass, measured by viscometry, is 6650 g/mol.

The Tg is 89° C. (measured by DSC: 10 K/min).

The WDPA is easily dispersible in water up to 40% by weight. The particle size of the WDPA in a dispersion is 62 nanometers.

Example 2

Preparation by introducing all the monomers at the start of a mono-unsaturated UWDPA functionalized by crotonic acid.

The operating method corresponds to that of Example 1, except that instead of the cinnamic acid, the reactor is charged with 13.07 g of crotonic acid (i.e. 0.152 mol) which corresponds to one crotonic acid unit per UWDPA chain.

The product obtained is slightly yellow, friable and colourless. The number-average molecular mass is 6600 g/mol.

The Tg is 83° C. (measured by DSC: 10 K/min).

The UWDPA is easily dispersible in water up to 40% by weight. The particle size of the UWDPA in a dispersion is 100 nanometers.

Example 3

Preparation by introducing all the monomers at the start of a UWDPA partially functionalized by 0.5 equivalents of crotonic acid per WDPA chain.

The operating method corresponds to that of Example 1, except that the following are introduced into this reactor: 339.0 g of lactam-6, i.e. 3.0 mol, 196.5 g of AH salt (the salt of adipic acid and hexamethylenediamine), i.e. 0.75 mol, 205.3 g of hexamethylenediamine, i.e. 1.767 mol, 168.5 g of isophthalic acid, i.e. 1.015 mol, 161.0 g of the monosodium salt of sulpho isophthalic acid, i.e. 0.6 mol, 6.55 g of crotonic acid, i.e. 0.076 mol, which corresponds to 0.5 cinnamic acid units per UWDPA chain, and 50 g of water.

The product obtained is slightly yellow, friable and odourless. The number-average molecular mass is 6600 g/mol.

The Tg is 90° C. (measured by DSC: 10 K/min).

The WDPA is easily dispersible in water up to 40% by weight. The particle size of the WDPA in a dispersion is 100 nanometers.

What is claimed is:

1. Water-dispersible polyamide of number-average mass ranging from 500 to 30,000 g/mol having, at the ends, from 0.1 to 2 unsaturated groups per chain and from 0.5 to 49 mol % of monomer (C) residue containing at least one hydrophilic group, these being distributed along the chain, wherein the monomer (C) is selected from the group consisting of dicarboxylic acids having 4 to 12 carbon atoms and having at least one sulphonate group.

2. Polyamide according to claim 1, wherein it contains from 3 to 25 mol % of monomer (C) residue.

3. Polyamide according to claim 1 wherein it contains, at the ends, from 0.5 to 2 unsaturated groups per chain.

4. Method for the preparation of a water dispersible polyamide, comprising heating, to a temperature ranging from 150° C. to 300° C., for a time of 2 to 8 hours in an inert atmosphere and at a pressure of 0.5 to 50 bar, a mixture consisting of:

0 to 99 mol % of at least one polyamide monomer (A);

0.5 to 50 mol % of at least one diamine (B) having from 4 to 12 carbon atoms;

0.5 to 49 mol % of at least one dicarboxylic acid (C) having 4 to 12 carbon atoms and having a sulphonate group;

0.5 to 30 mol % of at least one dicarboxylic acid (D) having 2 to 36 carbon atoms; and an effective amount of at least one compound (E) for tergninati polycondensation reaction, the compound (E) having an unsaturated group and being present in an amount sufficient to introduce at least 0.1 unsaturated group per PA chain.

5. Method according to claim 4, wherein A is selected from omega amino acids, their lactams or omega-amino acids, including: caprolactam, enantholactam, lauryllactam, amino caproic acid, oenantholactam, 7-amino heptanoic acid, 11-amino undecanoic acid and 12-amino dodecanoic acid.

6. Method according to claim 4 wherein B is selected from hexamethylenediamine, decamethylenediamine, dodecamethylenediamine, 1,5-diaminohexane, 2,2,4-trimethyl-1,6-diaminohexane, piperazine, 3,3'-dimethyl-4,4-diaminodicyclohexyl-methane, 4,4'-diaminodicyclohexyl-methane, 2,2'-(4,4'-diaminodicyclohexyl) propane, isophorone diamine, 1,4-diaminocyclohexane and meta-xylylenediamine.

7. Method according to claim 4, wherein D is selected from the group consisting of isophthalic, adipic, azelaic, sebacic, dodecanoic, butane doic, 1,4'-cyclohexyl dicarboxylic and terephthalic acids, content less than 12% by weight and dimerized fatty acids these dimerized fatty acids have a dimer content of at least 98% and optimally they are hydrogenated.

8. Method according to claim 4, wherein E is selected from unsaturated acids or acid esters, including acrylic, methacrylic, cinnamic, crotonic, citraconic, itaconic, vinylacetic, undecylenic, maleic, fumaric, 2-(5'-norbornyl) acrylic, 2-(3'-pyrrolyl) acrylic, N-allylaminobenzoic, N-acryloylaminobenzoic, N-methacryloylaminobenzoic, acryloyloxybenzoic, methacryloylbenzoic, N-acryloyl- or N-methacryloyl-p-aminophenylacetic and N-allyl-11-amino-undecanoic acids, and compounds thereof.

9. Method according to claim 4, wherein A, B, C and D are taken together in an acid/amine ratio of 1 in the presence of 0.1 to 2 mol of ethylenic acids and 1 mol of diamine.

* * * * *